United States Patent [19]
Anderson

[11] 4,060,751
[45] Nov. 29, 1977

[54] DUAL MODE SOLID STATE INVERTER CIRCUIT FOR STARTING AND BALLASTING GAS DISCHARGE LAMPS

[75] Inventor: Thomas E. Anderson, Normal, Ill.

[73] Assignee: General Electric Company, Schenectady, N.Y.

[21] Appl. No.: 662,523

[22] Filed: Mar. 1, 1976

[51] Int. Cl.² ............... H05B 37/02; H05B 39/04; H05B 41/36

[52] U.S. Cl. ............... 315/209 R; 315/DIG. 2; 315/DIG. 5; 315/239; 315/297; 315/241 R; 315/242; 331/113 A

[58] Field of Search ............... 315/DIG. 5, 209, 239, 315/97, 257, 297, 324, DIG. 2, 227, 241 R, 242, 243; 331/113 A

[56] References Cited

U.S. PATENT DOCUMENTS

| | | | |
|---|---|---|---|
| 3,146,406 | 8/1964 | Wilting | 331/113 A |
| 3,319,180 | 5/1967 | Mesenhimer | 331/113 A |
| 3,611,021 | 10/1971 | Wallace | 315/239 |
| 3,671,804 | 6/1972 | Church | 331/113 A |
| 3,723,848 | 3/1973 | Miller | 331/113 A |
| 3,754,160 | 8/1973 | Jensen | 331/113 A |
| 3,781,638 | 12/1973 | Anderson et al. | 331/113 A |
| 3,927,363 | 12/1975 | Mitchell et al. | 331/113 A |
| 3,953,780 | 4/1976 | Anderson et al. | 331/113 A |
| 4,005,335 | 1/1977 | Perper | 331/113 A |

Primary Examiner—Saxfield Chatmon, Jr.
Attorney, Agent, or Firm—Jack E. Haken; Joseph T. Cohen; Jerome C. Squillaro

[57] ABSTRACT

A variable frequency ac source drives a gas discharge lamp connected as a damping element in an otherwise high Q L-C circuit. Commutation of the ac source voltage is initiated as the instantaneous current drawn from the source equals a predetermined reference current level. Prior to lamp ignition the ac source drives the L-C circuit at resonance causing a voltage buildup which initiates an ignition. After ignition the source limits lamp current to provide a ballasting function.

14 Claims, 5 Drawing Figures

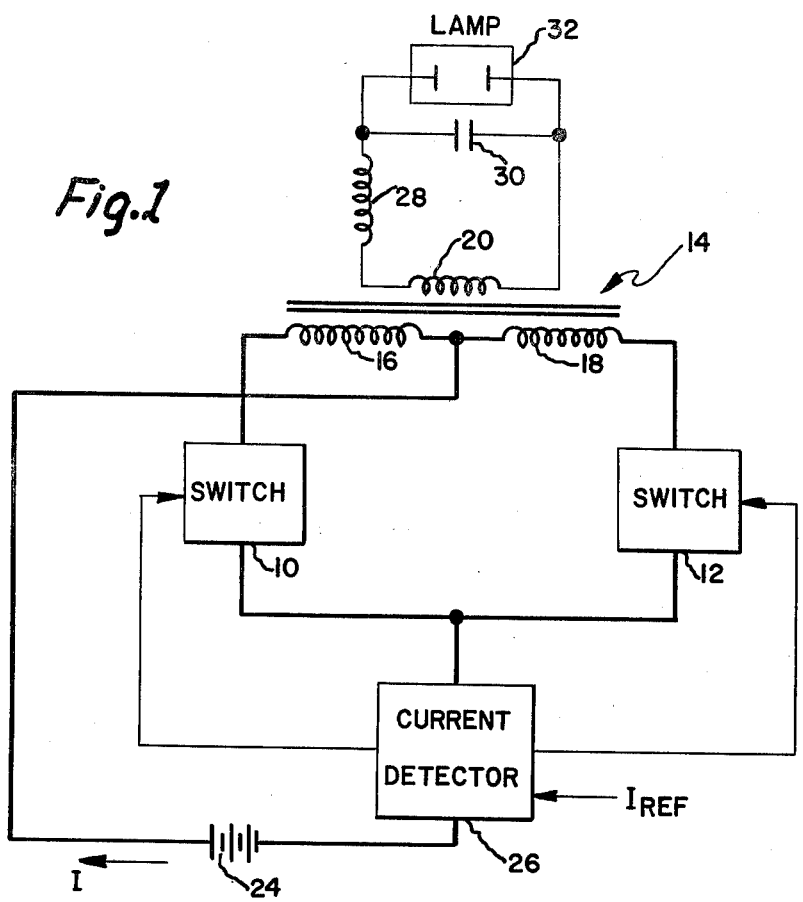
Fig.1
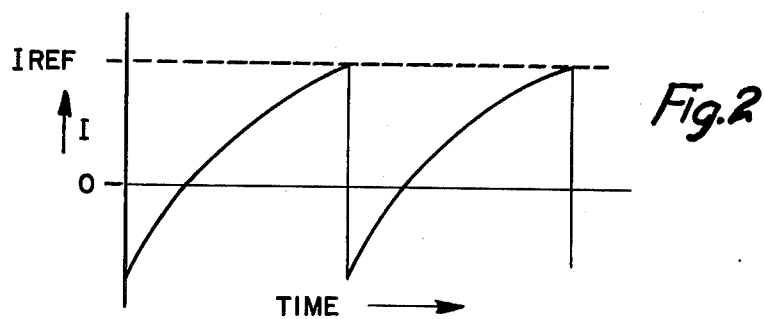
Fig.2
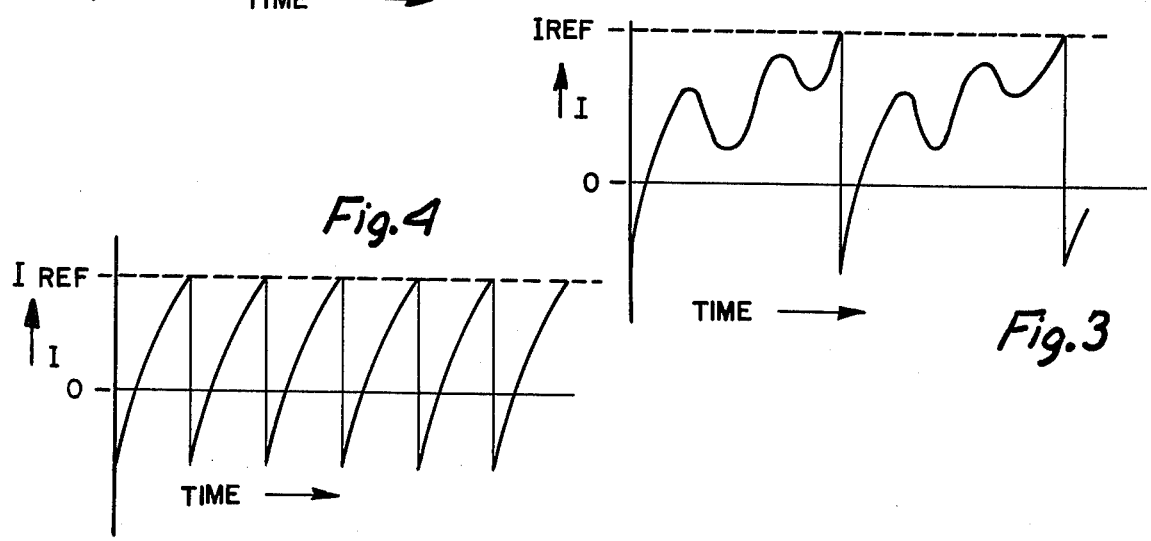
Fig.4
Fig.3

4,060,751

DUAL MODE SOLID STATE INVERTER CIRCUIT FOR STARTING AND BALLASTING GAS DISCHARGE LAMPS

BACKGROUND OF THE INVENTION

This invention relates to circuits for starting and ballasting gas discharge lamps. More specifically, this invention relates to inverter circuits for operating gas discharge lamps in resonant circuits wherein the inverter switching is controlled as a function of output current.

Starting and ballasting circuits are generally required for the stable and efficient operation of gas discharge lamps. Under operating conditions, the discharge lamp appears as a negative impedance device; that is, the voltage drop across a discharge lamp will tend to decrease with increasing discharge current. Ballasting circuits are normally connected to provide a positive series impedance or other current limiting mechanism to balance the negative lamp characteristic and provide stable operation. The voltage required to initiate a discharge in such lamps is, generally, substantially higher than the normal operating voltage of those lamps. Auxiliary starting circuits are generally utilized to provide a high starting voltage for a relatively short time to initiate a discharge.

In the prior art, the lamp ballasting function has generally been provided by an inductor or resistor connected in series with the discharge. The lamp starting the function has been provided by a number of circuits comprising for example, saturable magnetic cores or inductive voltage generators which were activated by time delay switches.

U.S. Pat. No. 3,781,638 and my copending U.S. patent application Ser. No. 516,722, now Pat. No. 3,953,780, with John P. Walden describe a class of solid state ac inverter circuits wherein commutation is initiated as the instantaneous load current crosses a predetermined threshold. The operating frequency of such circuits, therefore, tends to increase as the load impedance decreases. I have determined that these inverter circuits may be combined with gas discharge lamps connected in a resonant circuit to provide ballasting and starting functions.

SUMMARY OF THE INVENTION

A resonant circuit is formed by connecting an inductor in series with the parallel combination of a capacitor and a gas discharge lamp. This circuit is driven from the output of an ac inverter circuit of the type wherein commutation is initiated as load current crosses a predetermined threshold. Under starting conditions, the gas discharge lamp is characterized by a high impedance which combines with the inductor and capacitor to provide a high Q resonant circuit. The peak current switching characteristic of the inverter circuit, in the absence of a load on the resonant circuit, operates to hold its operating frequency at or near a fundamental or subharmonic of the resonant frequency. With the resonant circuit load connected, the current due to the resonance will build up to the switching threshold level and thus switch the inverter. This adds additional drive to the resonant circuit since the inverter is now force-operated at the output circuit resonant frequency. The peak ac voltage across the capacitor rises in response to the resonant condition and initiates a discharge in the lamp.

Under operating conditions, the impedance of the discharge lamp decreases and greatly lowers the Q of the resonant circuit. The inverter than functions as a current regulator which effectively ballasts the lamp and limits its input power for stable operation.

BRIEF DESCRIPTION OF THE DRAWINGS

The novel features believed to be characteristic of the present invention are set forth in the appended claims. The invention itself, together with further objectives and advantages thereof, may best be understood with reference to the following detailed description, taken in connection with the appended drawings in which:

FIG. 1 is a functional block diagram of the circuit of the present invention;

FIG. 2 graphically represents current flow in the inverter of FIG. 1 during normal operation of the discharge lamp;

FIG. 3 graphically represents current flow in the inverter of FIG. 1 prior to operating at resonance;

FIG. 4 graphically represents current flow in the inverter of FIG. 1 prior to lamp ignition with resonant current exceeding reference current.

DESCRIPTION OF THE PREFERRED EMBODIMENTS

Figure 5:
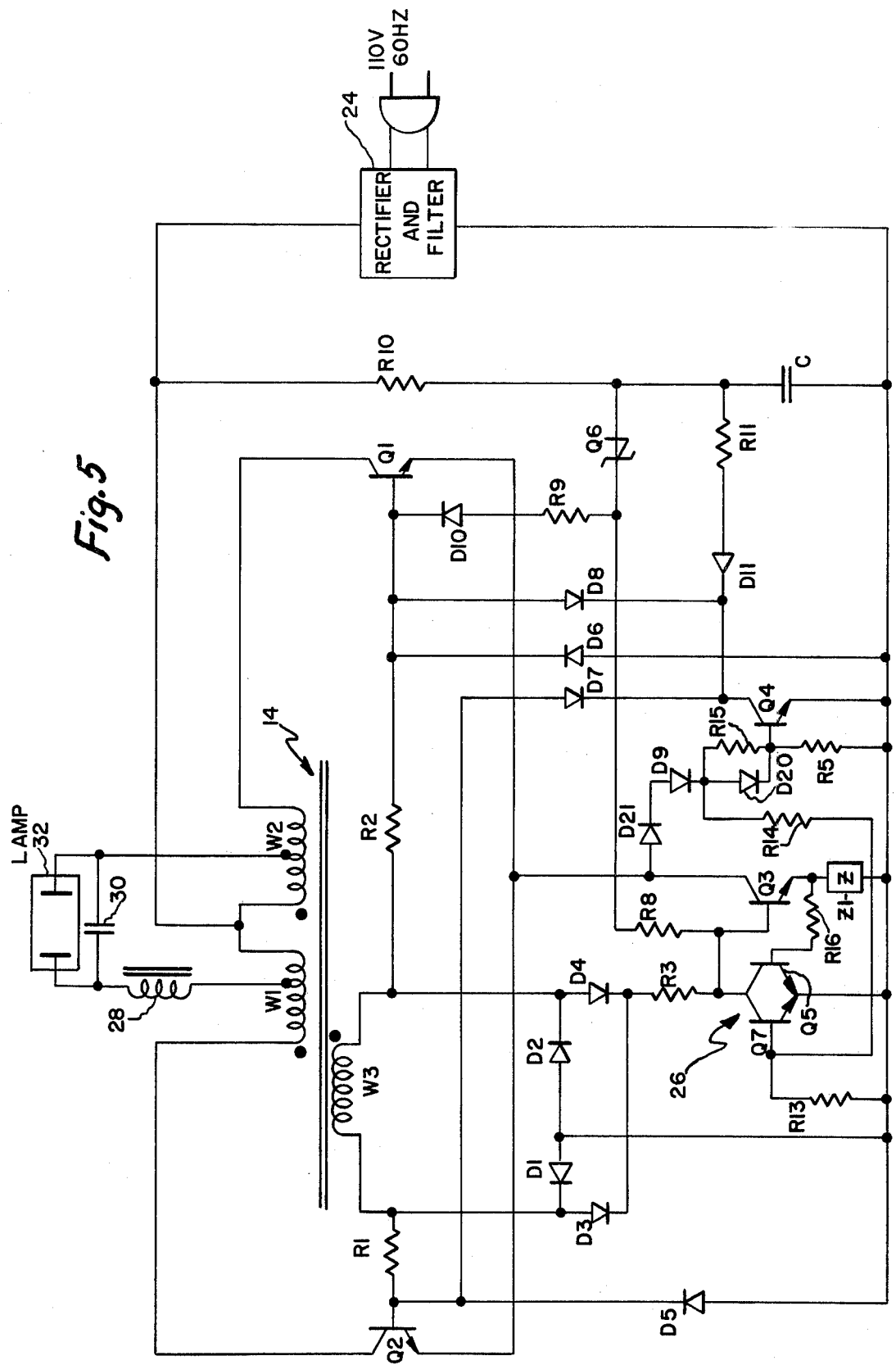
FIG. 5 is a circuit for a preferred embodiment of the invention.

FIG. 1 is a functional representation of a preferred circuit embodiment of the present invention. A gas discharge lamp 32 which may be of any conventional type or which may, alternately, be an induction ionized lamp of the type described in U.S. Pat. Nos. 3,521,120 and 3,500,118 is connected in series with the secondary winding 20 of a transformer 14 and an inductor 28. A capacitor 30 is connected in parallel with the lamp 32. Prior to ignition, the lamp 32 presents a high impedance across its terminals so that the capacitor 30 and inductor 28 form a high Q, series resonant circuit with the transformer secondary winding 20. The inverter operates to seek the resonant frequency of the inductor 28 and capacitor 30 to provide additional drive to the resonant circuit, thus increasing the voltage across capacitor 30. After ignition, the effective impedance of the lamp drops markedly and swamps out the impedance of the capacitor 30; substantially lowering the Q of the resonant circuit.

A pair of windings 16 and 18 on the transformer 14 are connected in series to form a center-tapped primary. The outer ends of the windings 16 and 18 are connected, respectively, through inverter switches 10 and 12 to a node at a first terminal of a current detecting circuit 26. A power source 24 is connected, in series, through the current detector and between the common node of the switches 10 and 12 and the center-tap of the transformer primary formed by the junction of windings 16 and 18. The current detector circuit is connected to control the switches 10 and 12 and functions to commutate the inverter circuit as the current drawn from the power source, I, crosses a reference current level $I_{Ref}$.

The inverter circuit formed by switches 10 and 12, transformer 14, and current detector 26 is known to the prior art and described, for example, in U.S. Pat. No. 3,781,638 to Thomas E. Anderson and John P. Walden and in a pending U.S. patent application Ser. No. 516,772 which has been assigned to the assignee of this invention. The operation of such inverter circuits is described in the aforementioned patent disclosures which are incorporated by reference, as background material, in this disclosure.

In normal steady-state operation, with the lamp 32 ignited, the inverter circuit functions to limit lamp and transformer primary current in the manner described in the background disclosures. This operation may be further explained with reference to FIG. 2 which indicates current flow from the power source 24 as a function of time. Assuming the commutation has just occurred and switch 10 is conducting, the power source 24 current is initially negative mainly due to the inductive load, inductor 28. The load impedance is reflected to switch 10 through transformer 14 as an inductorresistor (lamp) load and the current increases exponentially to the predetermined reference current, $I_{Ref}$. If the transformer 14 core saturates before the load current builds to the reference current, $I_{Ref}$, then current flow from the power source 24 increases sharply until it reaches the predetermined current level, $I_{Ref}$. At this point, current detector circuit 26 turns switch 10 to the nonconducting state and switch 12 to the conducting state. Current now flows from the power source 24 through winding 18 and switch 12 with a waveform similar to that drawn through switch 10. The current in the secondary winding 20 of the transformer alternates in response to the alternate current flow through windings 16 and 18 and is limited by the inductance 28 in conjunction with the lamp 32 impedance.

The inverter switching point is determined in response to peak load current and functions to maintain a constant power input (secondary current multiplied by the effective resistance of the lamp) to a lamp load despite changes in the input voltage from the power source 24. The frequency of the inverter adjusts to the variations in the voltage from the power source 24 in order to maintain constant volt-seconds in the inductor 28. Increased voltage results in an increase in the operating frequency.

The operation of the ballast circuit prior to lamp starting may be illustrated with reference to FIG. 3 which indicates current flow from the power source 24 as a function of time. As switch 10 closes, current flow through the winding 16 rises in response to a current flow in the secondary winding 20, inductor 28, and capacitor 30. The impedance of the lamp 32 prior to starting is very high so that current flow in the secondary circuit is confined to the series resonant inductor 28 and capacitor 30. If the Q of the secondary circuit is sufficiently high, that is greater than 2 or 3, the circuit rings at its natural resonant frequency and the inductor 28 and capacitor 30 each reflect a resonant current back into the primary winding 16 which exceeds the reference current level, $I_{Ref}$ and initiates commutation of the output voltage, further driving the circuit resonance. Under resonant drive conditions, the ringing voltage across the capacitor 30 builds up to several times the open circuit voltage on transformer winding 20 and functions to ignite the lamp 32.

The resonant starting circuit will function to ignite the lamp so long as the resonant frequency of the inductor 28 and capacitor 30 is somewhat higher than the no-load operating frequency of the inverter. Operation is, however, enhanced if the resonant frequency of the secondary circuit is approximately equal to a harmonic of the unloaded inverter frequency, for example, the third harmonic (shown in FIG. 4). The inverter will drive the load circuit at resonance until the lamp ignites. If the Q of the resonant circuit is sufficiently high, the voltage applied to the lamp will rise approximately three times if the circuit resonates at the inverter's third harmonic, five times for fifth harmonic resonance, and so forth.

A preferred embodiment of a ballast and starting circuit of the present invention is illustrated schematically in FIG. 5. Direct current power is obtained from an ac line with a conventional rectifier and filter circuit 24. The collectors of transistors Q2 and Q1, which function respectively as the switches 10 and 12 of FIG. 1, are connected to the ends of transformer windings W1 and W2. The opposite ends of the windings W1 and W2 are connected together to form a center-tap and to the positive terminal of the rectifier and filter, the power source 24. The emitters of transistors Q1 and Q2 are connected together and to ground through an emitter switching transistor Q3 in series with a current sensing impedance Z1. The windings W1 and W2 are tapped to form an autotransformer secondary corresponding to the secondary winding 20 of FIG. 1. An inductor 28 is connected between the tap of the winding W1 and one end of a discharge lamp 32, the other end of the discharge lamp 32 is connected to the tap of the winding W2. A capacitor 30 is connected in parallel with the lamp 32 to form a series resonant circuit.

Inverter operation is started by a circuit comprising trigger diode Q6; diode D10; resistors R8, R9, and R10; and capacitor C. Initially capacitor C is discharged. With voltage applied from the power source 24, capacitor C charges, by an appropriate time constant, determined by R10, to the trigger voltage of Q6. The breakdown of Q6 then supplies a pulse into the bases of transistors Q1 and Q3 through the resistors R8, and R9 with diode D10, respectively. The function of D11 and R11 is to stop random pulsing of the starting circuit by discharging the capacitor C under normal operation.

With the pulse provided from the starting circuit, transistors Q1 and Q3 turn on forcing a voltage across windings W2 and W3 such that the primary current flow from the power supply is through W2, Q1, Q3, and Z1. Once the voltage has been impressed across W3, base current to transistor Q1 is supplied through R2, Q1, Q3, Z1, and D1. Base current to Q3 is supplied through D4, R3, Q3, Z1, and D1. Hence, the starting pulse is no longer required.

The primary current through W2, Q1, and Z1 is a function of both load and core characteristics. As time progresses, with no L-C-lamp load, the primary current increases due to magnitizing current and ultimately increases very rapidly as the core approaches saturation. By proper selection of Z1, Q5 can be designed to turn on due to the voltage drop across Z1 at the onset of core saturation. Z1 and Q5 function as the current detector 26 of FIG. 1. Ideally, a constant current source is desired for Z1, but it can be approximated by a resistor, diode, transistor, or any combination. Base current to keep Q3 on originates from W3 and passes through D4, R3, Q3, Z1, and D1. The turning on of Q5 diverts base current flow from the transistor Q3 allowing Q3 to come out of saturation. This allows the emitters of Q1 and Q2 to rise within increasing collector voltage across Q3. As the voltage increases, D21, D9, and R14 conduct, turning on Q7 which further turns off Q3 and maintains Q3 off during the switching period. Immediately after Q7 conducts, D20 and Q4 turn on, shifting the primary current from Q3's collector to Q4's base. The turn on of Q4 has the function of discharging C through R11 and D11 and more importantly to pull the bases of Q1 and Q2 to near ground potential through D8 and D7. Thus, the emitter of Q1 rises four diode drops above ground, while the base is clamped at two diode drops above ground. Q1's base emitter is therefore, reverse biased for rapid turn-off. With Q2 turned off, the energy in the transformer causes a reversal of voltage on all windings. Base current is now supplied to Q2 from W3 through R1, Q2, Q3, Z1, and D2. Base current to Q3 is supplied from W3 through D3, R3, Q3, Z1, and D2. Main current from the rectifier and filter 24 passes through W1, Q2, Q3, and Z1. The switching action back to Q1 initiates when the voltage across Z1 is again sufficient to turn on Q5.

Parasitic components R5 and R13 are to guarantee that Q4 and Q7 respectively are off in the absence of definite base current.

Since the lamp appears resistive at high frequency, it is desirable to make the turns ratio of the autotransformer taps as small as possible to reduce the volt-ampere rating of the transistors and transformer. The limit, however, is the point where the lamp extinguishes due to low line voltage.

The circuit of the present invention functions as a solid state ballast to limit gas discharge lamp current and as a resonant starter to provide high voltage for lamp ignition. The circuit allows constant lamp power input for varying line voltage and, in a preferred embodiment, contains a minimum number of capacitors to permit efficient integration in monolithic form.

The invention has been described in detail herein in accord with certain embodiments thereof. It will be recognized, however, that many modifications and changes therein may be effected by those skilled in the art. For example, the switching elements of the inverter circuit may comprise transistors, silicon controlled rectifiers, or any other switching elements commonly utilized in the inverter art. Likewise, the gas discharge lamp may comprise a fluorescent lamp, a mercury vapor lamp, or any other type of conventional or induction ionized gas discharge lamp known to the art. Accordingly, it is intended by the appended claims to cover all such modifications and changes as fall within the true spirit and scope of the invention.

The invention claimed is:

1. A circuit for starting and ballasting a gas discharge lamp comprising:
   inverter means for producing an alternating current output between a first output terminal and a second output terminal, including means for commutating the polarity of the voltage of said output at such times as the instantaneous value of said alternating current output equals a reference current level;
   a capacitor and inductor connected in series between said first output terminal and said second output terminal to form a resonant circuit; and
   a gas discharge lamp connected in parallel with said capacitor.

2. The circuit of claim 1 wherein said inverter means further include a transformer which functions to couple said current output to said output terminals.

3. The circuit of claim 2 wherein said transformer comprises autotransformer windings.

4. The circuit of claim 2 wherein said transformer has a saturable core and wherein said reference current level is selected to produce commutation of said alternating current output as said core approaches saturation.

5. The circuit of claim 1 wherein the resonant frequency of said series resonant circuit is greater than the unloaded operating frequency of said inverter means.

6. The circuit of claim 5 wherein said reference current level is selected to produce commutation as a function of current flow in said resonant circuit and in said gas discharge lamp.

7. The circuit of claim 5 wherein said means for commutating functions to cause the inverter to operate at said resonant frequency prior to ignition of said lamp.

8. The circuit of claim 5 wherein said resonant frequency is a harmonic of said unloaded operating frequency.

9. The circuit of claim 5 wherein said resonant frequency is the third harmonic of said unloaded operating frequency.

10. The circuit of claim 9 wherein said means for commutating functions to cause said inverter to seek and operate at said resonant frequency prior to ignition of said lamp.

11. The circuit of claim 1 wherein the Q of said series resonant circuit is 2 or greater prior to ignition of said gas discharge lamp.

12. The circuit of claim 5 wherein said inverter circuit comprises:
   a center tapped transformer winding;
   a pair of transistors switching elements, the collector of each of said transistor switching elements being connected respectively to opposite ends of said transformer winding and the emitters of said transistor switching elements being connected to a common node;
   a direct current voltage source connected in series with a center tap of said primary winding and with the common node of said transistor switching elements;
   means for assuring that one and only one of said transistors switching elements is in substantial conduction at any time; and
   means for switching the conductivity of at least one of said transistor switching elements in response to current flow from said voltage source.

13. The circuit of claim 12 where said means for switching the conductivity comprises a third switching element connected in series between the common node of said transistor switching elements and said direct current voltage source.

14. The circuit of claim 13 wherein said third switching element is forced to a nonconducting state at such times as the instantaneous value of said alternating current output exceeds said reference current level.

* * * * *